(12) United States Patent
Pliska et al.

(10) Patent No.: US 7,008,121 B2
(45) Date of Patent: Mar. 7, 2006

(54) APPARATUS AND METHOD FOR REAL-TIME OPTICAL FIBER COUPLING

(75) Inventors: Anne-Claire Pliska, Hausen am Albis (CH); Max Erick Busse-Grawitz, Kerns (CH)

(73) Assignee: CSEM Centre Suisse D'Electronique et de Microtechnique SA, Neuchatel (CH)

( * ) Notice: Subject to any disclaimer, the term of this patent is extended or adjusted under 35 U.S.C. 154(b) by 190 days.

(21) Appl. No.: 10/782,012

(22) Filed: Feb. 19, 2004

(65) Prior Publication Data

US 2004/0165838 A1    Aug. 26, 2004

(30) Foreign Application Priority Data

Feb. 21, 2003   (EP) .................................. 03405112

(51) Int. Cl.
*G02B 6/26*   (2006.01)
*G02B 6/42*   (2006.01)

(52) U.S. Cl. ...................................................... 385/90
(58) Field of Classification Search ............ 385/37–39, 385/88–93, 147; 372/6; 359/318, 298, 315
See application file for complete search history.

(56) References Cited

U.S. PATENT DOCUMENTS

| 5,881,198 A | 3/1999 | Haake |
| 6,280,100 B1 | 8/2001 | Haake |
| 6,456,751 B1 | 9/2002 | Helkey, et al. |
| 6,829,079 B1 * | 12/2004 | Oda et al. .................... 359/318 |
| 2002/0110328 A1 | 8/2002 | Bischel, et al. |
| 2004/0122328 A1 * | 6/2004 | Wang et al. ................. 600/476 |

OTHER PUBLICATIONS

Enikov, E.T., et al,: "Three-dimensional microfabrication for a multi-degree-of-freedom capacitive force sensor using fibre-chip coupling," Journal of Micromechanics and Microengineering, Dec. 2000, IOP Publishing, UK, vol. 10, No. 4, pp. 492-497.

* cited by examiner

*Primary Examiner*—Akm Enayet Ullah
(74) *Attorney, Agent, or Firm*—Weingarten, Schurgin, Gagnebin & Lebovici LLP

(57) ABSTRACT

The optical fiber coupling apparatus (1) for coupling light from a light-emitting device (3) into an optical fiber (4) in an optoelectronic package comprises a microactuator (8) for positioning the end of the fiber (4) with respect to the light-emitting device (3), and a control circuit (9) in which the manipulated variable is a position of the fiber end. The control circuit (9) comprises outcoupling means (41) for coupling out of the fiber (4) a well-defined portion of the light propagating through the core of the fiber (4) and a photodetector (5) for detecting the intensity of the out-coupled light portion. The controlled variable in the control circuit (9) is the light intensity detected by the photodetector (5), from which a microprocessor (6) calculates command signals for the microactuator (8). Thus, a remote control of the optical coupling without any external intervention is achieved.

22 Claims, 2 Drawing Sheets

APPARATUS AND METHOD FOR REAL-TIME OPTICAL FIBER COUPLING

This application claims priority to a European patent application No. 03 405 112.8 filed Feb. 21, 2003.

FIELD OF THE INVENTION

This invention relates generally to optoelectronic devices, and specifically to an apparatus and a method for optical fiber coupling, according to the preambles of the independent claims. The invention can be used in an optoelectronic package such as a transmitter, an amplifier, a receiver, a light-emitting diode (LED), a pump laser etc. Its applications are for instance in optoelectronic modules for telecommunication applications, in airplanes where the quantity of optical fibers is extremely large, or in any sensor device involving a coupling of light into or out of an optical fiber.

BACKGROUND OF THE INVENTION

The manufacture of optoelectronic modules, for instance an optoelectronic transmitter (or receiver), requires that an optical fiber be properly aligned and fixed in front of the emitting (or receiving, respectively) device. A critical parameter is the transmission efficiency between the emitting (or receiving, respectively) device and the fiber. The objective is to maximize the transmission efficiency and to minimize the optical coupling losses.

The alignment of an optoelectronic device to the output (or input) optical fiber is the most critical step in the optoelectronic package manufacturing. Indeed, optical connections are highly sensitive to the relative motion between the optoelectronic device (laser, photodiode, light-emitting diode (LED), semiconductor optical amplifier (SOA), etc.) and the other optical components, which typically include a lens and a fiber, but can also include an isolator, mirrors, etc. They require extremely accurate submicrometer alignment and an attachment process that will maintain the alignment both during assembly and in the field. The techniques for locking an optical fiber within an optoelectronic package must be reproducible and reliable over time and under harsh conditions (temperature cycling and humidity). As explained below, the current techniques have all theirs drawbacks and do not provide a complete satisfactory solution to these demands.

Prior-art standard optical fiber alignment approaches fall under either active or passive alignment techniques. The former have a poor resolution of 1 or 2 $\mu$m which prevents their use in most configurations. The latter yields a final positioning accuracy of roughly 250 nm; however, it shows a post-bonding shift which is not easily controllable. In practice, the pigtailing process takes roughly 10 to 15 minutes for one fiber.

All the above techniques fail when the optoelectronic package experience large temperature changes (from −40° C. to 85° C.), either imposed by external environmental conditions or by the optoelectronic device operation itself (internally generated heat). This is especially true for packages free of thermo-electric coolers (TEC). The heat generated during device operation is not properly evacuated and yields misalignment between the optoelectronic device and the output fiber through a mismatch of thermo-mechanical properties of the coupling system (which includes the device submount, device solder, fiber solder, etc.).

Once in the field, the optical fiber connection should remain in place without need of repair. To overcome these shortcomings, The Boeing Company and MacDonnell Douglas Corporation have proposed the use of a microactuator within the package itself to enable a re-alignment of the fiber once the package is hermetically sealed. They proposed two different solutions:
- a carrier movably mounted on a substrate, with the fiber permanently fixed on it (U.S. Pat. No. 5,602,955), or
- the possibility of softening again the solder and moving the fiber to the optimum position before cooling down the solder (U.S. Pat. No. 6,164,837).

The apparatus described in the aforementioned patents do not allow a complete remote actuation of the optical coupling since the module has to be taken out of the "network" to improve the optical connection.

In U.S. Pat. No. 6,280,100, a photodetector for detecting undesired light propagating in the fiber cladding is provided in the module. Optimum coupling is supposed to be found when the photodetector signal is zero. However, this optimization scheme can lead to a zero-coupling result since the optimum coupling is found on a zero-signal configuration. The processing of signals is not described.

Other types of micro XYZ stages have been proposed in E. T. Enikov and J. B. Nelson, "Three-dimensional microfabrication for a multi-degree of freedom capacitive force sensor using fibre-chip coupling", Journal of Micromechanical engineering, 10, 492–497, 2000, or in L. Y. Lin, J. L. Shen, S. S. Lee, M. C. Wu, "Surface-Micromachined micro-XYZ stages for free-space microoptical bench", IEEE Photon. Tech. Lett. 9, 345–347, 1997.

SUMMARY OF THE INVENTION

It is an object of the invention to provide an apparatus and a method for optical fiber coupling which allow a remote control of the optical coupling without any external intervention but avoids the disadvantages of the prior art. This and other objects are achieved by the apparatus and the method defined in the independent claims.

The invention proposes the use of a control circuit for achieving a real-time optimum alignment of the fiber end with respect to an optoelectronic device. In the following, (A) the case of a light-emitting optoelectronic device and (B) the case of a light-receiving optoelectronic device will be discussed separately. Both cases are expressions of the same invention and they mutually pass one into the other essentially by a reversion of time or a reversion of direction.

In both cases, the control circuit has the following common characteristics:
(a) The disturbance is any undesired relative movement between the fiber end and the optoelectronic device. Such movements may be caused by external accelerations, temperature changes, etc.
(b) The actuator is a microactuator for positioning the end of the fiber with respect to the optoelectronic device.
(c) The manipulated variable is a position of the fiber end with respect to the optoelectronic device, positioned by the microactuator.
(d) The controller determining the manipulated variable is, e.g., a microprocessor.

A. Coupling of Light from a Light-emitting Device into an Optical Fiber

In this case, the control circuit has the following specific characteristics:
(e) The controlled variable is the intensity of a well-defined, small portion of the light propagating through the core of the fiber.

(f) The measuring device for measuring the controlled variable is a photodetector.

(g) The command variable to be reached and held by the control circuit is a maximum intensity detectable by the photodetector at optimum alignment.

Accordingly, the inventive optical fiber coupling apparatus for coupling light from a light-emitting device into an optical fiber comprises a microactuator for positioning the end of said fiber with respect to said light-emitting device, and a control circuit. Said control circuit comprises outcoupling means for coupling out of said fiber a well-defined portion of the light propagating through the core of said fiber, and a photodetector for detecting the intensity of said outcoupled light portion. Said control circuit has a controlled variable and a manipulated variable determined from said controlled variable, wherein said controlled variable is the light intensity detected by said photodetector, and said manipulated variable is a position of the fiber end positioned by said microactuator.

The inventive method for coupling light from a light-emitting device into an optical fiber comprises the steps of:

positioning the end of said fiber with respect to said light-emitting device;

incoupling light from said light-emitting device into the core of said fiber, so that light propagates through the core of said fiber;

coupling out of the fiber a well-defined portion of the light propagating through the core of said fiber;

detecting the intensity of said light portion; and performing a control operation, wherein said detected light intensity is used as the controlled variable from which the manipulated variable is determined in said control operation and the position of the fiber end is used as the manipulated variable in said control operation.

B. Coupling of Light from an Optical Fiber into a Light-receiving Device

In this case, the control circuit has the following specific characteristics:

(e) The controlled variable is the intensity of a reference light signal emitted by a light source with an essentially constant intensity and coupled into the core of the fiber.

(f) The measuring device for measuring the controlled variable is the optoelectronic device, together with means for separating the reference light signal from other light signals.

(g) The command variable to be reached and held by the control circuit is a maximum intensity detectable by the optoelectronic device at optimum alignment.

Accordingly, the inventive optical fiber coupling apparatus for coupling light from an optical fiber into a light-receiving device comprises a microactuator for positioning the end of said fiber with respect to said light-receiving device, and a control circuit. Said control circuit comprises a reference light source for emitting a reference light signal with an essentially constant intensity, and incoupling means for coupling said reference light signal into the core of said fiber. Said control circuit has a controlled variable and a manipulated variable determined from said cotrolled variable, wherein said controlled variable is the intensity of said reference light signal coupled into the fiber core and detected by said light-receiving device, and said manipulated variable is a position of the fiber end positioned by said microactuator.

The inventive method for coupling light from an optical fiber into a light-receiving device comprises the steps of:

positioning the end of said fiber with respect to said light-receiving device;

incoupling a reference light signal with an essentially constant intensity into the core of said fiber, so that a portion of said reference light signal propagates through the core of said fiber;

detecting the intensity of said light portion in said light-receiving device; and performing a control operation, wherein said detected light intensity is used as the controlled variable from which the manipulated variable is determined in said control operation and the position of the fiber end is used as the manipulated variable in said control operation.

Throughout this document, terms such as "light" or "photo . . . " are used for any kind of electromagnetic radiation, such as visible light, infrared (IR) or ultraviolet (UV) radiation.

BRIEF DESCRIPTION OF THE DRAWINGS

Embodiments of the invention are described in greater detail hereinafter relative to the attached schematic drawings.

DESCRIPTION OF PREFERRED EMBODIMENTS

Figure 1:
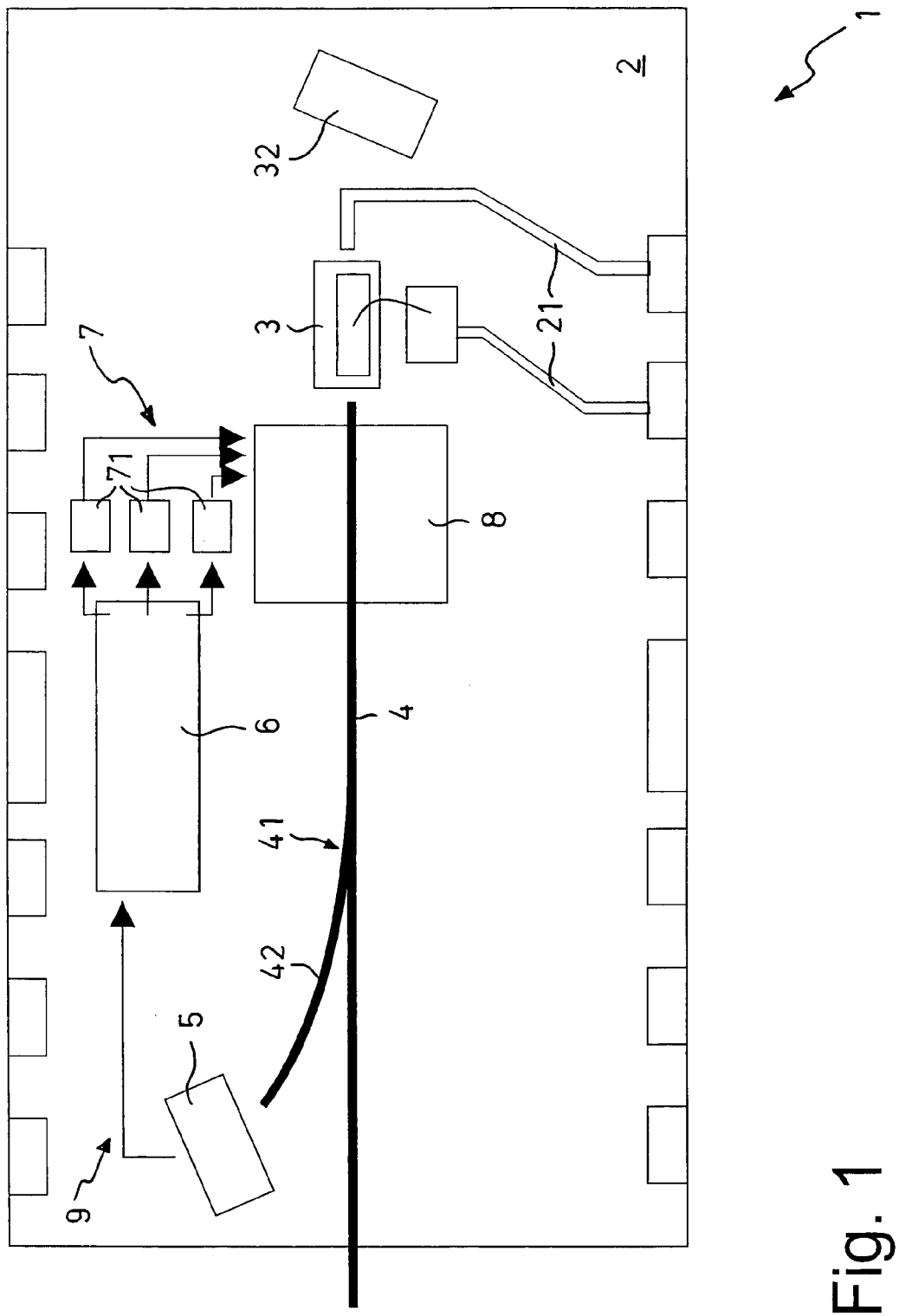
FIG. 1 shows a diagrammatic top view of a first embodiment of an apparatus according to the invention.

A first embodiment, corresponding to the above-discussed case A, of a real-time coupling apparatus 1 according to the invention is illustrated in FIG. 1. The drawing shows a laser 3 with a monomode fiber 4 mounted on a submount 2. Only a few electric lines 21 are shown.

The submount 2 is any type of substrate such as a structured silicon or preferably silicon-on-insulator (SOI) microbench or a printed circuit board (PCB). It is fabricated by photolithography, wet etching, reactive-ion-etching processes and metal deposition. The structures and electrical lines on the submount 2 provide all necessary hybridization functions.

The laser 3 is soldered on a metallic pad on the submount 2. Passive alignment elements (not shown) are provided during the submount fabrication process. These elements can include keying features for flip-chip operation (standoffs, indentations, vision marks, etc.). The accuracy of the laser positioning can then be as accurate as 1 μm.

Two photodetectors are also soldered on the submount 2. A first photodetector 5 detects a small percentage, e.g., 0.1%–10% and preferably about 1%, of the light coupled into the fiber core, and thus monitors the coupling efficiency. The first photodetector 5 is slightly tilted (by about 5°–15°, preferably about 10°) to prevent reflections coming back to the laser 3. A second photodetector 32 behind the laser 3 collects residual light leaving the rear endface of the laser 3 and ensures that the laser 3 is properly working. This second photodetector 32 is slightly tilted as well.

The fiber 4 to be aligned to the laser device 3 is preferably fixed in a multi-degree-of-freedom V-groove or U-groove. The precise location of the groove is positioned by a microactuator 8, e.g., an electrostatic comb actuator such as described in E. T. Enikov and J. B. Nelson, "Three-dimensional microfabrication for a multi-degree of freedom capacitive force sensor using fibre-chip coupling", Journal of Micromechanical engineering, 10, 492–497, 2000, (see especially FIG. 5 on page 495) or a series of bimorphic actuators such as described in U.S. Pat. No. 5,881,198.

The light coupled into the fiber 4 is split into two portions. A first, major portion of the light, e.g., 90%–99.9%, preferably 99%, is guided to an apparatus output through the output fiber 4. A second, minor portion of the light, which is complementary to the first portion, is lead to the first photodetector 5, e.g., through an auxiliary fiber 42. The splitting can be performed by appropriate splitting means 41 such as a 1%/99% optical-fiber coupler. Alternatively, a fiber grating coupler can be used to couple out of the output fiber the small percentage of the light. The small amount of light detected by the first photodetector 5 is a direct measure for the overall coupling efficiency from the laser 3 to the fiber 4. The higher the detected signal, the better the coupling efficiency.

A microprocessor 6 processes the light-measurement information from the first photodetector 5. It sends appropriate command signals to an actuator circuit 7 comprising analog/digital converters and corresponding current or voltage sources 71. The actuator circuit 7 has three channels, one for each degree of freedom. Thus, the fiber actuator 8 is controlled by a control circuit 9 so as to optimize the coupling efficiency. In order to compensate for power fluctuations of the laser 3, the output signal of the first photodetector 5 can be scaled with the output signal of the second photodetector 32, e.g., numerically in the microprocessor 6.

The Hill climb method (cf. Th. H. Cormen, Ch. E. Leiserson, R. L. Rivest, C. Stein, "Introduction to Algorithms", MIT Press, 2001) is a standard fine-alignment algorithm that can be implemented in the microprocessor 6. The jitter inherent to this method can be detrimental for some applications but can be electronically corrected. The real-time active alignment can be performed either permanently or periodically; in the latter case, the moving stage is frozen between two subsequent alignment steps.

In a preferred embodiment with an SOI submount 2, the microprocessor 6 is manufactured in complementary-metal-oxide-semiconductor (CMOS) technology to benefit from the use of a SOI substrate. The microprocessor 6 could then be fabricated during the submount fabrication process. This on-chip integration of a CMOS circuit is a new feature in this context.

The microprocessor 6 can also be integrated as a multi-chip module (MCM). In this configuration, the different elements of the microprocessor 6 are soldered on the SOI (or silicon) microbench.

Electrical connections to the apparatus are provided by wire bonding.

Figure 2:
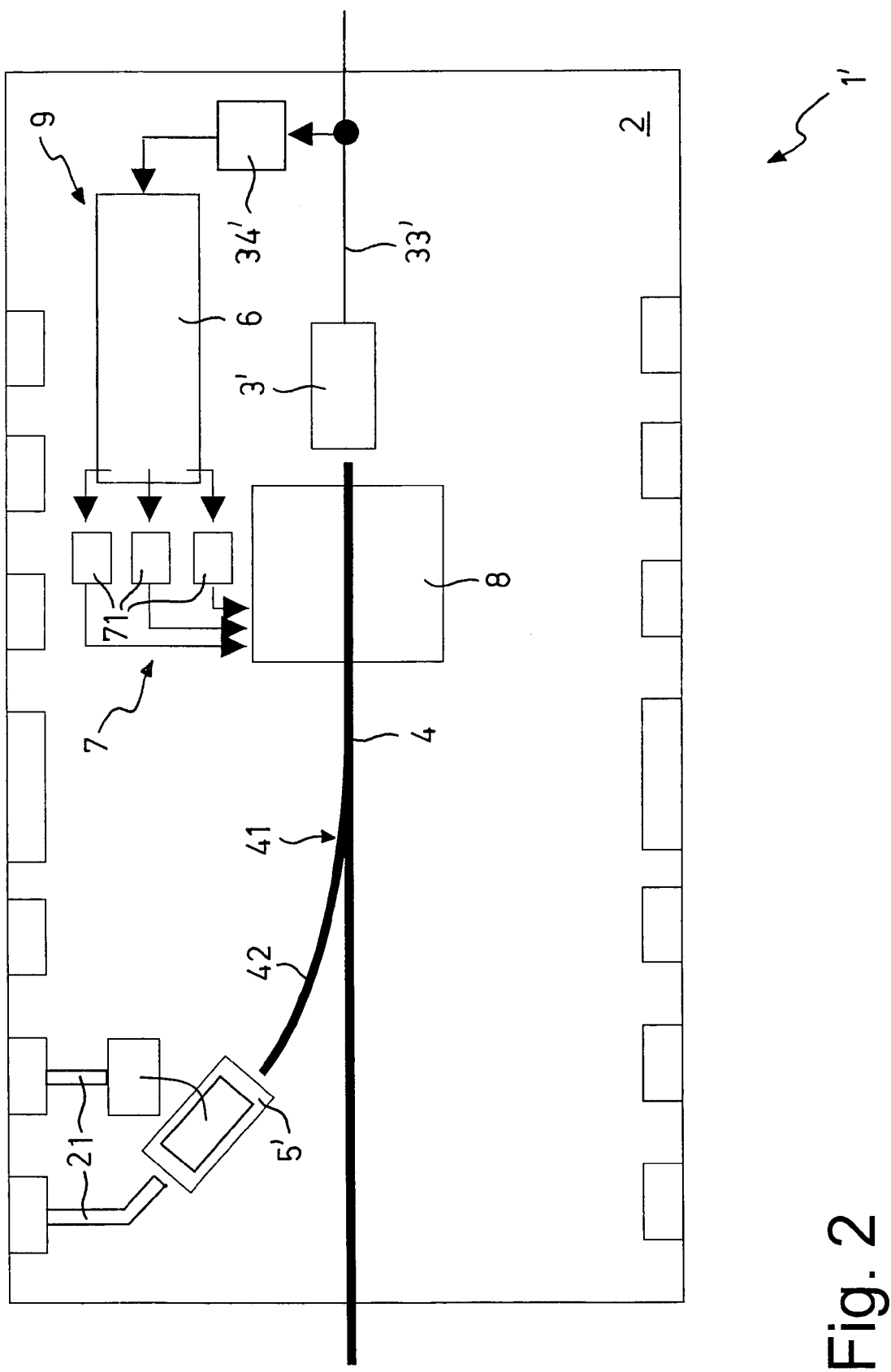
FIG. 2 shows a diagrammatic top view of a second embodiment of an apparatus according to the invention.

A second embodiment of an apparatus 1' according to the invention is shown in FIG. 2. This embodiment corresponds to the above-discussed case B, i.e., an apparatus 1' for coupling of light out of an optical fiber 4 into a light-receiving device 3'. Elements which are identical or analogous to those in FIG. 1 are designated by the same reference signs.

In contrast to the first embodiment of FIG. 1, the second embodiment comprises a reference light source 5', e.g., a laser. The intensity of the reference light signal emitted by the reference laser 5' is application dependent. If the reference signal and the input signal have different modulation frequencies, then the level of the reference signal is not relevant, since the two signals can be electronically demultiplexed and only the reference signal is used for the optimization of the coupling alignment. If both signals are CW signals or have the same modulation frequency, the intensity of the reference signal should not disturb the detection of the input signal. For this purpose, the intensity of the reference signal should be smaller than the intensity of the input signal, e.g., 0.1%–10% and preferably about 1% of the input-signal intensity.

The light signal emitted by the reference laser 5' is coupled into the core of the fiber 4, e.g., by an optical fiber coupler or a fiber grating coupler 41. The light is coupled out of the fiber 4 and detected by the light-receiving device 3'. An output line 33' is provided for carrying an output signal, e.g., an electric output signal, of the light-receiving device 3'. In this output signal, the portion corresponding to the detected reference light signal is separated from other signals. Means 34' appropriate for such a signal separation may be, e.g., a low-pass filter, or a band-pass filter in case of a synchroneous detection of the reference light signal. The separated signal is then processed analogously to the embodiment of FIG. 1. By the resulting microprocessor commands, the fiber actuator 8 is controlled so as to optimize the coupling efficiency. A second photodetector (not shown) may be provided for compensating power fluctuations of the reference laser 5', in the same way as in the embodiment of FIG. 1.

This invention is not limited to the preferred embodiments described above, to which variations and improvements may be made, without departing from the scope of protection of the present patent.

LIST OF REFERENCE SIGNS

1 Apparatus, first embodiment
1' Apparatus, second embodiment
2 Submount
21 Electric lines
3 Light-emitting device
32 Second photodetector
3' Light-receiving device
33' Output line
34' Signal separation means
4 Fiber
41 Outcoupling means
41' Incoupling means
42 Auxiliary fiber
5 First photodetector
5' Reference light source
6 Microprocessor
7 Actuator circuit
71 Current or voltage sources
8 Microactuator
9 Control circuit

What is claimed is:

1. An optical fiber coupling apparatus for coupling light from a light-emitting device into an optical fiber, comprising:
   a microactuator for positioning the end of said fiber with respect to said light-emitting device, and
   a control circuit comprising
      outcoupling means for coupling out of said fiber a well-defined portion of the light propagating through the core of said fiber and
      a photodetector for detecting the intensity of said outcoupled light portion,
   said control circuit having a controlled variable and a manipulated variable determined from said controlled variable, wherein
      said controlled variable is the light intensity detected by said photodetector and said manipulated variable is a position of the fiber end positioned by said microactuator.

2. The optical fiber coupling apparatus according to claim 1, wherein said outcoupling means comprise an optical fiber coupler or a fiber grating coupler.

3. The optical fiber coupling apparatus according to claim 1, wherein said outcoupling means are such that the intensity of said well-defined light portion is between 0.1% and 10% of the intensity of said light propagating through the core of the fiber.

4. The optical fiber coupling apparatus according to claim 3, wherein said outcoupling means are such that the intensity of said well-defined light portion is about 1% of the intensity of said light propagating through the core of the fiber.

5. The optical fiber coupling apparatus according to claim 1, further comprising a second photodetector for monitoring the operation of said light-emitting device.

6. The optical fiber coupling apparatus according to claim 1, further comprising a microprocessor for processing an output signal of said photodetector and for controlling said microactuator.

7. The optical fiber coupling apparatus according to claim 6, wherein said apparatus is based on a silicon-on-insulator microbench and said microprocessor is integrated on said microbench by a complementary-metal-oxide-semiconductor technology or as a multi-chip module.

8. The optical fiber coupling apparatus according to claim 1, wherein said fiber end is embedded in a multi-degree-of-freedom U-groove of V-groove.

9. The optical fiber coupling apparatus according to claim 1, wherein said microactuator is suited for positioning the fiber end in three dimensions and preferably comprises an electrostatic comb actuator or a series of bimorphic actuators.

10. An optical fiber coupling apparatus for coupling light from an optical fiber into a light-receiving device, comprising:
a microactuator for positioning the end of said fiber with respect to said light-receiving device, and
a control circuit comprising
a reference light source for emitting a reference light signal with an essentially constant intensity and
incoupling means for coupling said reference light signal into the core of said fiber,
said control circuit having a controlled variable and a manipulated variable determined from said cotrolled variable, wherein
said controlled variable is the intensity of said reference light signal coupled into the fiber core and detected by said light-receiving device and
said manipulated variable is a position of the fiber end positioned by said microactuator.

11. The optical fiber coupling apparatus according to claim 10, wherein said incoupling means comprise an optical fiber coupler or a fiber grating coupler.

12. The optical fiber coupling apparatus according to claim 10, further comprising means for separating said reference light signal from other light signals propagating through said fiber core.

13. The optical fiber coupling apparatus according to claim 10, further comprising a microprocessor for processing an output signal of said light-receiving device and for controlling said microactuator.

14. The optical fiber coupling apparatus according to claim 13, wherein said apparatus is based on a silicon-on-insulator microbench and said microprocessor is integrated on said microbench by a complementary-metal-oxide-semiconductor technology or as a multi-chip module.

15. The optical fiber coupling apparatus according to claim 10, wherein said fiber end is embedded in a multi-degree-of-freedom U-groove of V-groove.

16. The optical fiber coupling apparatus according to claim 10, wherein said microactuator is suited for positioning the fiber end in three dimensions and preferably comprises an electrostatic comb actuator or a series of bimorphic actuators.

17. A method for coupling light from a light-emitting device into an optical fiber, comprising the steps of:
positioning the end of said fiber with respect to said light-emitting device;
incoupling light from said light-emitting device into the core of said fiber, so that light propagates through the core of said fiber;
coupling out of the fiber a well-defined portion of the light propagating through the core of said fiber;
detecting the intensity of said light portion; and
performing a control operation, wherein
said detected light intensity is used as the controlled variable from which the manipulated variable is determined in said control operation and
the position of the fiber end is used as the manipulated variable in said control operation.

18. The method according to claim 17, wherein the intensity of said well-defined light portion is chosen to be between 0.1% and 10% of the intensity of said light propagating through the core.

19. The method according to claim 18, wherein the intensity of said well-defined light portion is chosen to be about 1% of the intensity of said light propagating through the core.

20. The method according to claim 17, wherein the Hill climb method is used for determining the position of the fiber end from the intensity of said light coupled into the fiber core in said control operation.

21. A method for coupling light from an optical fiber into a light-receiving device, comprising the steps of:
positioning the end of said fiber with respect to said light-receiving device;
incoupling a reference light signal with an essentially constant intensity into the core of said fiber, so that a portion of said reference light signal propagates through the core of said fiber;
detecting the intensity of said light portion in said light-receiving device; and
performing a control operation, wherein
said detected light intensity is used as the controlled variable from which the manipulated variable is determined in said control operation and
the position of the fiber end is used as the manipulated variable in said control operation.

22. The method according to claim 21, wherein the Hill climb method is used for determining the position of the fiber end from the intensity of said light coupled into the fiber core in said control operation.

* * * * *